United States Patent
Youn et al.

(10) Patent No.: US 9,207,736 B2
(45) Date of Patent: Dec. 8, 2015

(54) APPARATUS AND METHOD FOR PREVENTING MALFUNCTION

(71) Applicant: Samsung Electronics Co., Ltd., Gyeonggi-do (KR)

(72) Inventors: Jong-Hyeok Youn, Gyeonggi-do (KR); Young-Jin Kim, Gyeonggi-do (KR); Cheol-Yoon Chung, Gyeonggi-do (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 182 days.

(21) Appl. No.: 13/969,304

(22) Filed: Aug. 16, 2013

(65) Prior Publication Data

US 2014/0053007 A1    Feb. 20, 2014

(30) Foreign Application Priority Data

Aug. 17, 2012  (KR) .................. 10-2012-0090298

(51) Int. Cl.
*G06F 11/00* (2006.01)
*G06F 1/26* (2006.01)
*G06F 11/07* (2006.01)

(52) U.S. Cl.
CPC .............. *G06F 1/266* (2013.01); *G06F 11/004* (2013.01); *G06F 11/0742* (2013.01)

(58) Field of Classification Search
CPC ................................................ G06F 11/0742
USPC ................... 714/47.1, 47.2, 47.3, 48, 5.1
See application file for complete search history.

(56) References Cited

U.S. PATENT DOCUMENTS

| | | | | |
|---|---|---|---|---|
| 5,758,103 A | * | 5/1998 | Oh | 710/302 |
| 6,412,068 B1 | * | 6/2002 | Nolan et al. | 713/1 |
| 6,725,312 B1 | * | 4/2004 | Biage | 710/305 |
| 2004/0179718 A1 | * | 9/2004 | Chou | 382/115 |

* cited by examiner

Primary Examiner — Dieu-Minh Le

(57) ABSTRACT

An apparatus for preventing a malfunction of a peripheral device in a portable terminal with multiple processors includes a battery, a peripheral device electrically connected to a switch through a I/O pins, a first processor in which a control port for the peripheral device is electrically connected to the switch through the GPIO method, and which controls driving of the peripheral device through generation of a normal high signal, a second processor electrically connected to the switch through the GPIO method, and the switch driven by the battery, configured to operate such that the control port of the first processor is grounded when it is determined that an unintended high signal is generated from the second processor before the portable terminal is completely booted.

12 Claims, 4 Drawing Sheets

APPARATUS AND METHOD FOR PREVENTING MALFUNCTION

CROSS-REFERENCE TO RELATED APPLICATION(S) AND CLAIM OF PRIORITY

The present application is related to and claims the priority under 35 U.S.C. §119(a) to Korean Application Serial No. 10-2012-0090298, which was filed in the Korean Intellectual Property Office on Aug. 17, 2012, the entire content of which is hereby incorporated by reference.

TECHNICAL FIELD

The present disclosure relates generally to a portable terminal, and more particularly, to an apparatus and a method for preventing a malfunction in a portable terminal.

BACKGROUND

Portable terminals are being developed in various forms such as Smart Phones, and Tablet PCs, and providing a variety of functions for users, thereby becoming more common in use.

As the portable terminals provide various functions as mentioned above, peripheral devices included in the portable terminals are gradually increasing in number.

For example, a flash LED along with a camera is included in the portable terminals, and a vibration motor is also included in the portable terminal due to addition of a vibration mode.

Such a peripheral device as described above may be controlled through General Purpose I/O pins (GPIO). The peripheral devices electrically connected to the GPIO are activated by rising edges or high signals, and deactivated by falling edges or low signals.

Meanwhile, various types of processor (for example, Application Processor, or Central Processing Unit) are employed in the portable terminals according to types of portable terminal.

However, when a battery is inserted into the portable terminal, or a power-on button is input to the portable terminal, the above-mentioned peripheral devices may malfunction due to combinations of specific processors.

For example, when the battery is inserted into the portable terminal, or a power-on button is input to the portable terminal in a power-off state, unspecified high signals are generated in the processors, and the peripheral devices connected to the processors through GPIO ports are unintentionally driven by the generated high signals.

The reason of such a malfunction as described above is because processors are not capable of normally controlling, the peripheral devices of the portable terminal, when the battery is inserted into the portable terminal, or before the portable terminal is completely booted after the input of the power-on button.

Accordingly, it is necessary to solve the problem where the peripheral device malfunctions irrespective of the control of the processor before the portable terminal is completely booted.

SUMMARY

To address the above-discussed deficiencies of the prior art, it is a primary object to provide an apparatus and a method for preventing a malfunction of a peripheral device due to battery insertion or a power-on button input.

In accordance with an aspect of the present disclosure, an apparatus for preventing a malfunction of a peripheral device in a portable terminal with multiple processors is provided. The apparatus includes a battery, a peripheral device electrically connected to a switch through a I/O pins, a first processor whose a control port for the peripheral device electrically connected to the switch through I/O, configured to control operation of the peripheral device through generation of a normal high signal, a second processor electrically connected to the switch through the GPIO method, and the switch driven by the battery configured to operate such that the control port of the first processor is electrically connected to the peripheral device when it is determined that an unintended high signal is generated from the second processor before the portable terminal is completely booted.

In accordance with another aspect of the present disclosure, a method for preventing a malfunction of a peripheral device in a portable terminal is provided. The method includes determining whether or not the portable terminal is completely booted by using a switch which is electrically connected to a control port of a first processor for the peripheral device, and a second device through a I/O pin, and switching the switch such that the control port of the first processor is electrically connected to the peripheral device, when an unintended high signal occurs from the second processor before the portable terminal is completely booted.

According to embodiments of the present disclosure, when the battery is inserted into the portable terminal, or the power is applied to the portable terminal, the peripheral device can be prevented from malfunctioning in the state where control of the AP is impossible, whereby stability of the portable terminal can be improved, and a quality of experience can be enhanced.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 4B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electric device.

Figure 1A:
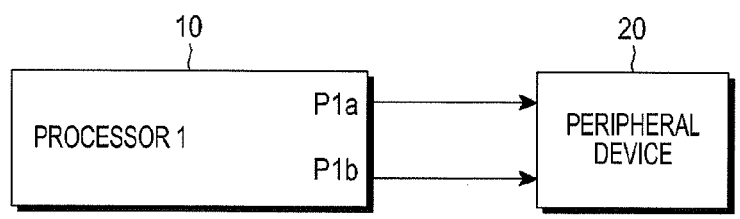
FIG. 1A is a schematic block diagram showing a portable terminal according to the related art.
Figure 1B:
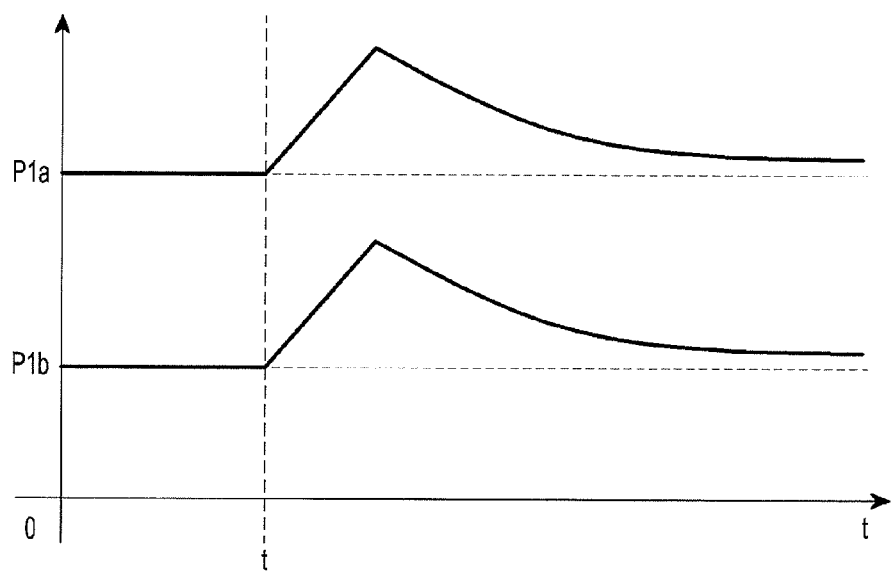
FIG. 1B illustrates a graph of signal versus time depicting progress of generation of high signals in processor 1 of a portable terminal according to the related art.

FIG. 1A is a schematic block diagram showing a portable terminal according to the related art, and FIG. 1B is a graph of signal versus time depicting progress of generation of high signals in processor 1 of a portable terminal according to the related art. The portable terminal according to the related art will be described with reference to FIGS. 1A and 1B.

Processor 1 10 shown in FIG. 1A controls a peripheral device 20 through two ports of a GPIO port P1a and a GPIO port P1b. Processor 1 10 applies high signals to the peripheral device 20 through the ports P1a and P1b to control the peripheral device 20 to be driven, and applies low signals to the peripheral device 20 through the ports P1a and P1b to control the peripheral device 20 to be stopped.

However, when a battery is inserted into the portable terminal, or a power-on button is input to the portable terminal in a power off state (for example, at a time point of zero shown in FIG. 1B), abnormal high signals are applied to the GPIO port P1a and the GPIO port P1b irrespective of control of the processor 1 10 at a time point of t shown in FIG. 1B. The peripheral device 20 starts to be driven in response to the abnormal high signals. For example, in a case where the peripheral device 20 corresponds to a flash LED of a camera, when the battery is inserted into the portable terminal, the flash LED of the camera is unintentionally turned on.

When the peripheral device malfunctions (for example, the peripheral device operates) according to the battery insertion or the power-on button input as described above, users should manually stop the peripheral device in the malfunction state after the portable terminal is completely booted.

Figure 2:
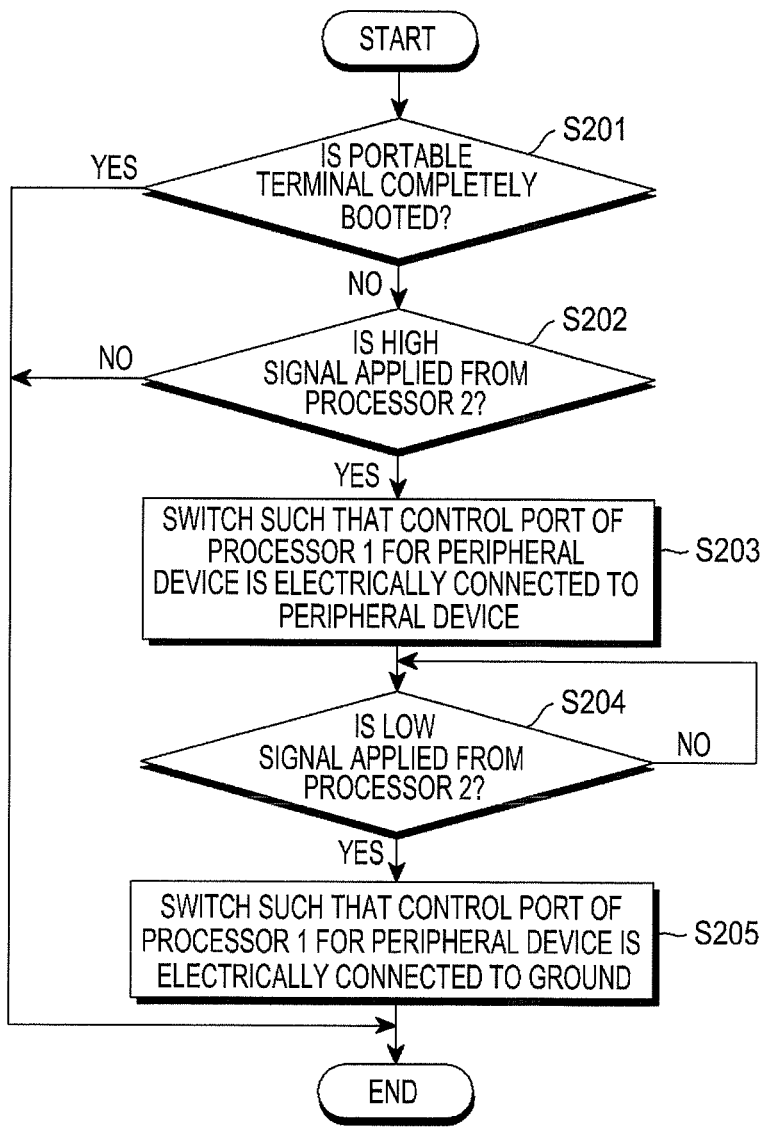
FIG. 2 is a flowchart showing a process of preventing a malfunction of a portable terminal according to an embodiment of the present disclosure.
Figure 3:
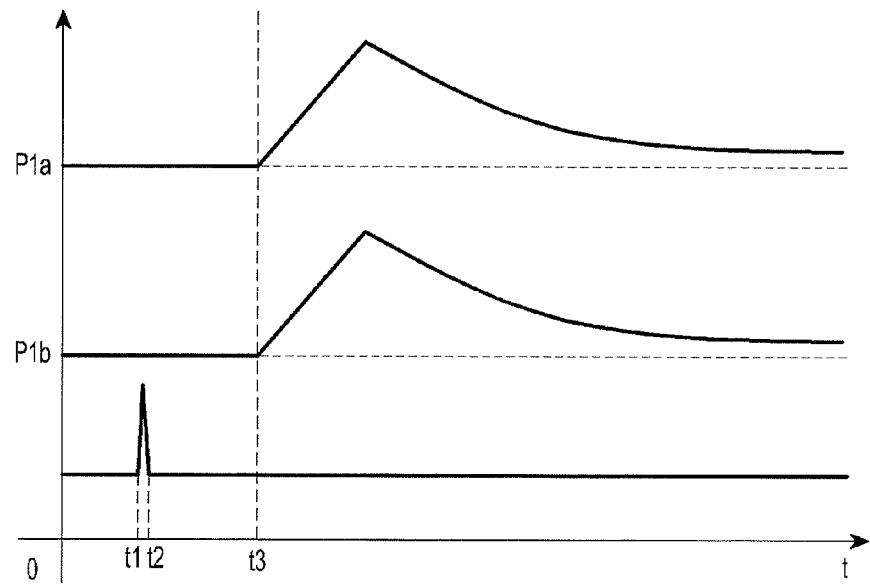
FIG. 3 illustrates a graph of signal versus time depicting progress of generation of high signals in processor 1 and processor 2 of a portable terminal according to an embodiment of the present disclosure.
Figure 4A:
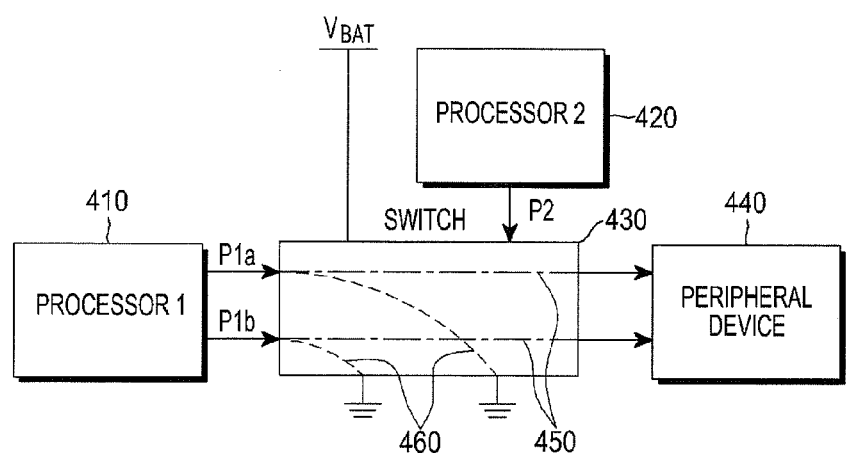
FIG. 4A is a schematic block diagram showing a portable terminal for preventing a malfunction according to an embodiment of the present disclosure.
Figure 4B:
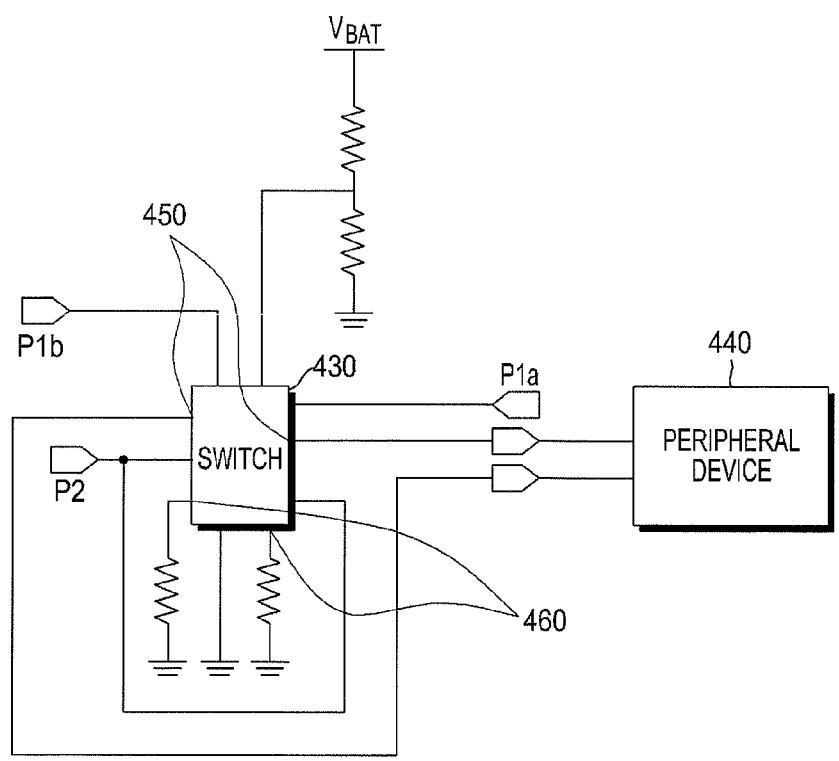
FIG. 4B is a schematic circuit diagram showing a portable terminal for preventing a malfunction according to an embodiment of the present disclosure.

FIG. 2 is a flowchart showing a process of preventing a malfunction of a portable terminal according to an embodiment of the present disclosure, and FIG. 3 is a graph of signal versus time depicting progress of generation of high signals in processor 1 and processor 2 of a portable terminal according to an embodiment of the present disclosure. FIG. 4A is a schematic block diagram showing a portable terminal for preventing a malfunction according to an embodiment of the present disclosure, and FIG. 4B is a schematic circuit diagram showing a portable terminal for preventing a malfunction according to an embodiment of the present disclosure. Hereinafter, embodiments of the present disclosure for preventing a malfunction of a portable terminal will be described in detail with reference to FIGS. 2 to 4B.

In steps S201 to S203, a determination is made as to whether or not a portable terminal is completely booted, and when it is determined that the portable terminal is not completely booted, a determination is made as to whether or not a high signal is applied from processor 2 420. And then, when it is determined that the high signal is applied from processor 2 420, a switch 430 is switched such that control ports P1a and P1b of processor 1 410 are electrically connected to the peripheral device 440.

First, referring to FIG. 4A, a portable terminal according to an embodiment of the present disclosure includes a plurality of processors of processor 1 (a first processor) 410 and processor 2 (a second processor) 420, a switch 430, and a peripheral device 440. In the embodiment of the present disclosure, it is assumed that processor 1 410, processor 2 420, the switch 430, and the peripheral device 440 are electrically connected to each other through General Purpose I/O pins (GPIO) method instead of an I2C method.

In the embodiment of the present disclosure, processor 1 410 represents an Application Processor (AP) or a Central Processing Unit (CPU), which is configured to control an overall operation of the portable terminal. For example, processor 1 410 of the embodiment of the present disclosure can correspond to, for example, MSM8960 or MSM8260.

Moreover, processor 1 410 according to the embodiment of the present disclosure applies a high signal or a low signal to the peripheral device 440 through a control port (a control pin) P1a or a control port (a control pin) P1b to control operation of the peripheral device 440.

In the embodiment of the present disclosure, processor 2 420 represents a Power Management IC (PMIC), for example, a PM8921. Accordingly, the portable terminal according to the embodiment of the present disclosure can be formed of a processor combination of, for example, MSM8960 and PM 8921, or a processor combination of, for example, MSM8260 and PM8921.

The peripheral device 440 corresponds to a peripheral device of the portable terminal which is driven or stopped in response to high signals or low signals applied from the control ports P1a and P1b of processor 1 410, and can be a flash LED included in a camera module (not shown), or a vibration motor used for informing of transmission/reception of communication.

Meanwhile, when a battery (not shown) is inserted into the portable terminal, or a power-on key of the portable terminal is pressed in a power-off state, unintended high signals are applied from the control ports P1a and P1b of processor 1 410 to the peripheral device 440 due to power noise, as a result, the peripheral device 440 operates.

Since the portable terminal is not in a booted state when the separated battery is inserted into the portable terminal, although processor 1 410 is in a non-operating state, the high signals can be unintentionally applied to the peripheral device 440 through the control ports P1a and P1b.

Alternatively, in a case that the power-on button is pressed in the power-off state with the battery inserted and the portable terminal starts to boot, processor 1 410 is not capable of normally controlling operation of the peripheral device 440 before the portable terminal 440 is completely booted, but high signals can be unintentionally applied to the peripheral device 440 through the control ports P1a and P1b.

At this time, there is a high probability of a problem, where the high signals are unintentionally applied to the peripheral device 440 through the control ports P1a and P1b when the battery is inserted into the portable terminal or the power-on button is pressed, when processor 1, for example, AP and processor 2, for example, PMIC are combined with each other such that the terminal operates.

The present disclosure proposes the switch 430 shown in FIGS. 4A and 4B in order to solve the above-mentioned problems based on such an observed result as described above. That is, on the basis of the observed result where the unintended high signals are generated in two processors with a time difference, the switch 430 according to an embodiment of the present disclosure solves the problem where the unintended high signals are applied from the control ports P1a and P1b to the peripheral device 440 so that the peripheral device 440 unintentionally operates in the portable terminal operating through a combination of the AP and the PMIC.

To this end, in the embodiment of the present disclosure, the switch 430 switches on/off an output path of the control ports P1a and P1b of processor 1 410 in response to a signal applied from processor 2 420 before the portable terminal is completely booted.

Referring to FIG. 3, it is observed that when the battery is inserted into the portable terminal operating through the combination of two processors (for example, the AP and the PMIC), or the power-on button is input to the portable terminal in the power off state, an unintended high signal is generated from a port P2 of processor 2 420 shown in FIG. 4A at a time point of t1, and after a while, unintended high signals are generated from the control ports P1a and P1b of processor 1 410 at a time point of t3.

Moreover, the high signal is generated from the port P2 only for a considerably short period of time, and is not generated any longer at time point t2 within a very short time interval from the time point t1 (it can be construed that a low signal is generated.)

Accordingly, in the embodiment of the present disclosure, the switch 430 prevents the peripheral device 440 from malfunctioning due to generation of high signals as those at time points t1, t2, and t3.

Referring back to FIG. 2, in steps S201 to S203, when the battery (not shown) is inserted into the portable terminal, or the power-on button is input to the portable terminal, the switch 430 according to the embodiment of the present disclosure is driven through an electric power (for example, Vbat) applied from the battery (not shown). Thereafter, the switch 430 requests a signal as to whether or not the portable terminal is completely booted from processor 1 410, and when not receiving the signal from processor 1 410, determines that the portable terminal is not completely booted.

Here, when the battery is inserted into the portable terminal, processor 1 410 is not in an operation state and fails to respond to the signal request of the switch 430, and while the portable terminal is being booted, although being in an operation state, processor 1 410 fails to transmit the signal as to whether or not the portable terminal is completely booted to the switch 430, because the portable terminal is not completely booted.

In the state where it is determined that the portable terminal is not completely booted, when it is determined that a high signal as that at time point t1 shown in FIG. 3 has been applied from the control port P2 of processor 2 420 to the switch 430, the switch 430 operates such that the control ports P1a and P1b of processor 1 410 for the peripheral device 440 are electrically connected to the peripheral device 440 as indicated by reference numeral 450 of FIG. 4A. Referring to FIG. 4B, when it is determined that the high signal is applied from the control port P2 to the switch 430, the switch 430 is switched such that the control ports P1a and P1b are electrically connected to the peripheral device 440 as indicated by the reference numeral 450.

Referring to FIG. 3, even if the high signal is generated in the control port P2 of processor 2 420 at time point t1, high signals are not generated in the control ports P1a and P1b of processor 1 410 before time point t3, with time point t2 being interposed between time points t1 and t3, when a low signal is generated in the control port P2. This implies that even if the control ports P1a and P1b of processor 1 410 are electrically connected to the peripheral device 440 as indicated by the reference numeral 450 of FIGS. 4A and 4B, the peripheral device 440 does not malfunction (the high signal is not applied to the peripheral device).

Accordingly, when the high signal occurs in the control port P2 before the portable terminal is completely booted, the switch 430 according to the embodiment of the present disclosure switches on an internal circuit such that the control ports P1a and P1b of processor 1 410 are electrically connected to the peripheral device 440.

In steps S204 and S205, a determination is made as to whether or not a low signal is applied from processor 2 420, and when it is determined that the low signal is applied from processor 2 420, the switch 430 is switched such that the control ports P1a and P1b of processor 1 410 for the peripheral device 440 are electrically connected to the ground.

The high signal, generated in the control port P2 of processor 2 420 when the battery (not shown) is inserted into the portable terminal or the power-on button is input to the portable terminal in the power off state, is maintained for a short period of time as shown in FIG. 3. For example, the high signal starts to be generated at time point t1, and then the low signal is generated (the high signal has disappeared) at time point t2.

When it is determined that a low signal as that at time point t2 is generated (an unintended high signal is not generated) in the control port P2, the switch 430 according to the embodiment of the present disclosure is switched such that the control ports P1a and P1b of processor 1 410 for the peripheral device 440 are electrically connected to the ground as indicated by reference numeral 460 of FIGS. 4A and 4B.

As shown in FIG. 3, this is because the unintended high signals occurs in the control ports P1a and P1b of processor 1 410 at time point t3, when a predetermined period of time passes after the low signal is generated (the unintended high signal is not generated) in the control port P2 at time point t2.

Even if the high signals are generated in the control ports P1a and P1b of processor 1 410 at time point t3 due to the battery insertion or the power-on button input, the generated high signals are not transmitted to the peripheral device 440 due to switching to the ground, whereby the peripheral device 440 can be prevented from malfunctioning.

Meanwhile, although devices which can be included in the portable terminal according to the embodiment of the present disclosure, are not shown in FIGS. 4A and 4B, it will be obvious to those skilled in the art to which the present disclosure pertains that the devices which are not shown in FIGS. 4A and 4B can be included in the portable terminal according to the embodiment of the present disclosure.

For example, devices such as a wireless transmitter/receiver for providing communication functions, a key input unit for performing a key input, a memory which is formed of a program memory and a data memory and in which programs for controlling general operations of the portable terminal are stored, and a display unit which outputs various pieces of display information generated in the portable terminal and includes a touch screen, can be included in the portable terminal according to the embodiment of the present disclosure. Here, the key input unit can include the power-on button described in the embodiment of the present disclosure.

Furthermore, the portable terminal according to the embodiment of the present disclosure can correspond to a mobile electronic device which can be readily carried, and a feature phone according to the related art and devices driven through a mobile OS such as Bada, Tizen, Window series (for example, windows 8), iOS, and Android can be illustrated as a portable terminal.

According to the embodiments of the present disclosure, the peripheral device can be prevented from malfunctioning in a state where control of the AP is impossible when the battery is inserted into the portable terminal, or the power is applied to the portable terminal, whereby stability of the portable terminal can be improved, and a quality of experience can be enhanced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A portable terminal comprising:
   a first processor comprising a first control port configured to control a peripheral device provided in the portable terminal, the first control port electrically coupled to a switch;
   a second processor comprising a second control port configured to sequentially transmit a first signal and a second signal that is different from the first signal, the second control port electrically coupled to the switch; and
   the switch configured to switch the first control port of the first processor to a ground in response to receiving the first signal from the second control port of the second processor and receiving the second signal from the second control port of the second processor within a predetermined time from the reception of the first signal prior to the portable terminal completing a booting operation.

2. The portable terminal of claim 1, wherein, if receiving the first signal from the second control port of the second processor, the switch is configured to switch the first control port of the first processor to the peripheral device.

3. The portable terminal of claim 1, wherein the first signal is a high signal and the second signal is a low signal.

4. The portable terminal of claim 1, wherein the switch is configured to receive the first signal from the first control port of the first processor after receiving the second signal from the second control port of the second processor.

5. The portable terminal of claim 1, wherein, if a battery is inserted into the portable terminal or if a power-on button is input to the portable terminal in a power-off state of the portable terminal, the switch is configured to receive the first signal and the second signal from the second control port of the second processor.

6. The portable terminal of claim 1, wherein the first processor is an Application Processor (AP) and the second processor is a Power Management Integrated Circuit (PMIC).

7. A method for preventing a malfunction of a peripheral device in a portable terminal, the method comprising:
   determining whether or not the portable terminal is completely booted; and
   operating a switch to switch a first control port of a first processor to a ground in response to receiving a first signal from a second control port of a second processor and receiving a second signal from the second control port of the second processor within a predetermined time from the reception of the first signal prior to the portable terminal completing a booting operation.

8. The method of claim 7, further comprising:
   if receiving the first signal from the second control port of the second processor, switching the first control port of the first processor to the peripheral device.

9. The method of claim 7, wherein the first signal is a high signal and the second signal is a low signal.

10. The method of claim 7, wherein the switch receives the first signal from the first control port of the first processor after receiving the second signal from the second control port of the second processor.

11. The method of claim 7, wherein, if a battery is inserted into the portable terminal or if a power-on button is input to the portable terminal in a power-off state of the portable terminal, the switch receives the first signal and the second signal from the second control port of the second processor.

12. The method of claim 7, wherein the first processor is an Application Processor (AP) and the second processor is a Power Management Integrated Circuit (PMIC).

* * * * *